Figure 1:
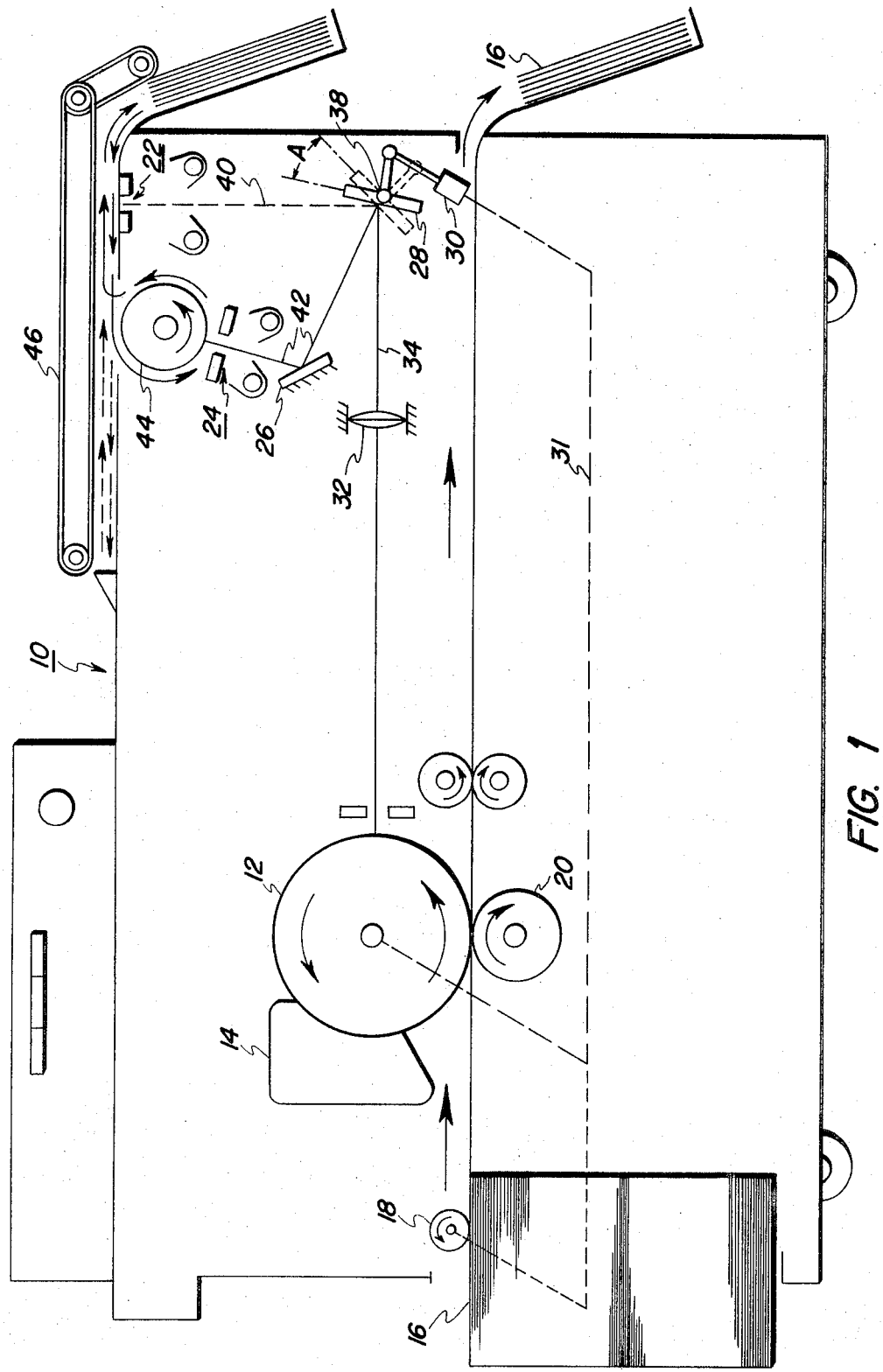

United States Patent [19]
Guenther

[11] 3,844,654
[45] Oct. 29, 1974

[54] DUPLEX COPYING SYSTEM
[75] Inventor: Joachim Guenther, Webster, N.Y.
[73] Assignee: Xerox Corporation, Stamford, Conn.
[22] Filed: Nov. 16, 1972
[21] Appl. No.: 307,279

[52] U.S. Cl. .................................................. 355/24
[51] Int. Cl. ........................................... G03b 27/32
[58] Field of Search ............................... 355/23, 24

[56] References Cited
UNITED STATES PATENTS
3,672,765   6/1972   Altmann ............................... 355/24

Primary Examiner—John M. Horan
Attorney, Agent, or Firm—James J. Ralabate; Paul F. Morgan; William A. Henry, II

[57] ABSTRACT

Duplex copying by imaging one side of the original at a first exposure station onto a photoreceptor through a single first mirror path, then turning the original over around a document drum and exposing it on this drum to provide a second exposure station. The image from the second exposure station is imaged onto the same photoreceptor through a two mirror path for relative reversion of the image. This two mirror path is provided by fixing a second mirror adjacent the document drum and by tilting the first mirror to look through the second mirror at the second exposure station. I.e., the first mirror shifts its view between the first exposure station and the second mirror. The pivoting of the first mirror can be coordinated with the movement of the photoreceptor and a copy sheet feeder to provide, with a transfer roller, direct duplex copying. The system requires only a single lens system and two plain mirrors, one fixed and one having a small degree of simple rotation.

14 Claims, 1 Drawing Figure

DUPLEX COPYING SYSTEM

The present invention relates to an improved apparatus and method for the optical reproduction of both sides of an original document onto a single duplicating imaging surface with a simplified optical arrangement.

The prior art includes numerous patents and other references, including those cited hereinbelow, relating to imaging systems for electrostographic apparatus, including apparatus and methods for duplex document copying having various mirror reflective path arrangements. Most of these are considerably more complex in structure and function than the apparatus disclosed herein, or suffer from other comparative disadvantages as will be more apparent from the discussion hereinbelow. Considering some of this art, all of which is incorporated by reference herein, U.S. Pat. No. 3,079,839 to E. E. Lohner et al is exemplary of duplex/duplex copiers incorporating two different exposure or imaging stations and having different mirror paths providing a different number of reflections and therefore relative reversion of the two images. Shifting mirrors in the optical path of duplex zerographic reproduction apparatus is taught by D. Rubin, Pat. No. 3,318,212, which provides a 180° flipping mirror assembly with a plain mirror on one side and a roof mirror on the opposite side thereof. C. F. Carlson, Pat. No. 3,506,347 is a duplex xerographic reproduction apparatus providing a document drum for reversing documents for duplexing while exposing the document on the document drum. Gopal Bhagat et al, Pat. No. 3,697,170, is exemplary of a number of patents teaching apparatus and methods for duplex copying whereas both sides of a final copy sheet can be reproduced simultaneously from a single photoreceptor drum by transferring one of the images to an image transfer storage member, which can also provide reversal of the images. Various sheet reversal mechanisms are illustrated, for example, in W. A. Drawe et al, Pat. No. 3,615,129 and M. R. Spear, Jr., Pat. No. 3,645,615. Other patents illustrating document copying apparatus employing a single optical path and reversal of the document after a first side has been imaged are illustrated in U.S. Pat. Nos. 3,227,444; 2,472,931; and 2,304,273. Duplexing systems in which opposite sides of the document are imaged onto two different photoreceptors is illustrated, for example, by U.S. Pat. Nos. 3,536,398 and 3,580,670 to Gopal Bhagat.

Although the above-cited references indicate extensive and long-standing efforts in the duplexing reproduction art, none of these references, individually or in combination, teach a duplexing apparatus or method in which two different exposure stations are provided for the two different sides of the original, with a two mirror system, with one mirror fixed and viewing one exposure station and the other mirror pivotable to shift its view to either the fixed mirror or the other exposure station, to provide alternate imaging of these two different images through a common lens system onto a single photoreceptor, thereby providing for duplex copying with a single optics system requiring only two mirrors and one lens system in which only one of the mirrors requires slight pivotable movement.

An exemplary embodiment of the present invention is shown and described hereinbelow as incorporated in an otherwise conventional exemplary xerographic apparatus and process. Accordingly, said xerographic process and apparatus need not be described in detail herein, since various printed publications and patents and publicly used machines are available which teach details of various suitable exemplary electrophotographic structures, materials and functions to those skilled in the art. Some examples are disclosed in the books "Electrophotography" by R. M. Shaffert, and "Xerography and Related Processes" by John H. Dessauer and Harold E. Clark, both first published in 1965 by Focal Press Ltd., London, England; and the numerous patents and other references cited in these books. All of these references are hereby incorporated by reference in this specification.

Further objects, features and advantages of the present invention pertain to the particular apparatus, steps and details whereby the above-mentioned aspects of the invention are attached. Accordingly, the invention will be better understood by reference to the following description and to the schematic drawing forming a part thereof, which is substantially to scale, wherein:

FIG. 1 is a schematic side view of an exemplary duplex/duplex xerographic apparatus in accordance with the present invention.

Referring to FIG. 1, there is shown therein an exemplary xerographic optical reproducing apparatus for providing duplex copying of an original document onto a single imaging surface in accordance with the present invention. This apparatus 10 is illustrated here schematically for clarity, since as noted above, the individual components thereof may be conventional ones to those skilled in the art already fully described in detail in the above-cited and other art.

In the exemplary apparatus 10 the imaging surface is a conventional xerographic photoconductor drum 12, with which there will be conventionally associated a developer station 14 and the other well-known xerographic components for charging, development, transfer, cleaning, optical imaging, etc. The image is transferable from the drum 12 to a copy sheet 16 fed thereto by conventional copy feed means 18. The copy sheet 16 may be, of course, individual pre-cut sheets as shown here or a continuous web sheet in fan fold, roll feed, etc., which may or may not be subsequently cut or burst. The copy shsset 16 is here fed between the photoconductor drum 12 and an opposing engaging image transfer drum 20 for providing simultaneous image transfer to both sides of the copy sheet in any suitable or conventional manner. (Note the prior art previously cited above for this particular feature).

The arrangement provided by the transfer drum 20 is integrally related to the optical system to be described, in that the simple optical system herein is adapted to provide an image of one side of the original on the photoreceptor drum 12 which is "wrong reading" or reverted on the drum. Alternately the image of the other side of the original is imaged onto the photoconductor drum 12 as a "right reading" image. The relative reversion between these two images is accomplished by having a single reflection in one image path and two reflections in the other image path. The "wrong reading" images on the photoconductor drum 12 may, of course, be directly transferred to the top side of the copy sheet 16. However, the alternate "right reading" images on the drum 12 are first transferred to the transfer drum 20, (the transfer reverts the image)

then transferred from the transfer drum 20 to the backside of the copy sheet 16.

It will be appreciated that for the above-described simultaneous image transfer to both sides of the copy paper that the optical imaging onto the photoreceptor must be coordinated with both the rotation of the photoconductor drum and the movement of the copy sheets. It will also be apparent that the optical arrangement described hereinbelow is advantageous whether or not a direct and simultaneous duplex/duplex system employing a transfer drum is utilized.

Considering the subject optical system of the apparatus 10, it comprises here a first exposure station 22, a second exposure station 24, a first (fixed) mirror 26 for the second exposure station 24, and a second (pivotable) mirror 28 rotated by a solenoid 30 or other suitable means for alternately viewing the first and second exposure station. In both such positions of the second mirror 28 the document image is reflected from the second mirror 28 through a common optical path 34, including a single common lens system 32, into the same exposure station of the photoconductive drum 12.

The second mirror 28 pivots between its first and second positions in simple rotation about an axis 38 directly adjacent the center of the mirror surface, and perpendicularly the plane of FIG. 1 here. The required rotation between these two different operating positions of the second mirror 28 is only a limited movement of substantially less than 90° about an axis 38, indicated by the angle "A" shown here.

The first operating position of the pivotable second mirror 28 is illustrated here by the alternate (dashed outline) position of the mirror 28 and its operating lever connected to the solenoid 30, and by the dashed lines representing a first reflective optical path 40. It may be seen that in this first position that the second mirror 28 is optically aligned with the first exposure station 22 and provides a direct, single reflection optical path from this first exposure station 22 to the photoconductive drum 12.

When the mirror 28 is pivoted by the solenoid 30 to its second operating position through the angle "A," i.e., to the indicated position (solid line outline) of the mirror 28, it may be seen that the mirror 28 is no longer aligned with or viewing the first exposure station 22. Instead, the mirror 28 is now optically aligned with the first (fixed) mirror 26 and the two mirrors together provide a second optical path 42 illustrated here in solid lines.

This second optical path 42 is from the second exposure station 24, reflected obtusely through the first mirror 26, then reflected acutely through the second mirror 28 to the photoconductive drum 12. Thus, since the two mirrors 26 and 28 are preferably single plane mirrors, it may be seen that in this second position of the mirror 28 that a double reflective path is provided between the second exposure station 24 and the photoconductor drum 12 using only the two mirrors, one of which (26) is fixed and the other of which (28) is a dual function mirror, changing its function simply by a slight rotational movement.

The second optical path 42, by virtue of the double reflection, provides relative reversion of a document exposed at the second exposure station 24 relative to document exposure at the first exposure station 22. It will be appreciated, of course, that additional mirrors may be introduced in the first optical path 40 and 42 for additional reflections if required for certain applications. However, the abovedescribed configuration is preferred here, since the second exposure station 24 here is also the station adapted to provide high speed repeat copying of a document. Since the second optical path 42 here is doubly reflective it provides a desired "wrong reading" image on the photoconductor drum 12 from the second exposure station 24 for direct transfer from the drum to the copy sheet 16.

It will be noted that the first mirror 26 is preferably positioned relatively closely adjacent to the second exposure station 24. The first exposure station 22 and the first mirror 26 are positioned sufficiently spaced apart angularly with relation to the axis of the rotation of the second mirror 28 so that there is no optical interference between the images therefrom. Yet, since this spacing (the angle between the first optical path 40 and the second optical path 42) determines the angle "A" through which the mirror 28 must rotate, it will be appreciated that the closer the spacing, the less pivotable movement of the mirror will be required, which is highly desirable since the reduction in the movement of the mirror 28 increases the potential speed of operation of the apparatus 10, reduces the inertial forces to which the mirror 28 is subjected, and reduces the power and movement requirements of the solenoid 30.

The second exposure station 24 here includes a rotatable document carrying drum 44, and it may be seen that the exposure of a document occurs on this document drum 44 as the document is being carried on and rotated by the document drum. The document may be held in this document drum 44 by a vacuum or sheet gripping means, mating rollers or other suitable retention devices, examples of which will be found in the above-cited references.

The document drum 44 provides at least three functions here. First of all it provides a document reversal means for turning a document over and providing for the exposure at the second exposure station 24 of a side of the document opposite from the side exposed in the first exposure station 22. Secondly, the document drum 44 provides a direction of motion of the document at the second exposure station which is opposite from the direction of motion at the first exposure station for proper scanning direction. Thirdly, by retaining the document on the document drum 44 for more than one cycle of rotation past the exposure slit of the second exposure station 24 multiple copies can be rapidly made thereof.

Both of the exposure stations 22 and 24 shown here are of the tupe wherein the document is moved past a stationary illuminated exposure slit, and both of the mirrors herein are held stationary during the document exposure until the entire document has passed the exposure slit. However, it will be appreciated that the above-described optical arrangement may also be utilized in a scanning exposure type of apparatus in which the document is stationary at the exposure station and the exposure slit, illuminator, and viewing mirror are moved instead to scan the document for exposure. In this latter type system, the first and second positions of the second mirror 28, instead of being two completely fixed positions, can actually be the two limited scanning angles required for the two imaging stations. These scanning angles cannot, of course, overlap one another and the mirror 28 would still have to be shifted as described above between the two distinct scanning angles or arcs for the two different exposure stations.

An exemplary schematic belt feed structure 46 is illustrated herein for the movement of the documents to be exposed from the document tray, across the first exposure station 22, and then onto, and returning from, the document drum 44. This path is illustrated, by solid arrows here. The apparatus 10 is adpated to provide all desired modes of duplication, and not just single pass duplex/duplex as discussed here. Thus, one alternate document feed path is illustrated by the dashed arrows under the belt feed 46.

The above-described components of the optical system are so arranged that the first optical path 40 has the same optical path length as the second optical path 42. This is highly desirable since it eliminates any refocusing of the single common lens system 32 for the two different exposure stations. Thus, the only movement required in the entire optical system for changing the imaging between exposure stations is the slight rotation of the mirror 28. This equal path length is readily accomplished by the present arrangement, even though the second optical path 42 is folded through its reflection on the first mirror 26, by positioning the document drum 44 closer to the second mirror 28 than the first exposure station is, and by locating the mirror 26 relatively closely adjacent the direct path between the second exposure station and the mirror 28, (utilizing an obtuse image reflection).

Further, the first exposure station 22 is here a horizontal platen on the top surface of the apparatus 10, whereas the document drum 44 and its second exposure station 24 is desirably mounted internally of the apparatus 10 below this top surface, and therefor closer to the mirror 28.

As previously mentioned, conventional and suitable means are, of course, provided to coordinate the activation of the solenoid 30 for pivoting the second mirror 28 in coordination with the rotation of the drum 12 and the actuation of the copy sheet feed means 18 in order to feed the copy sheet 16 in proper sequence and registration for the imaging thereon of the optical images from the respective exposure stations. This is illustrated schematically by the dashed connecting line 31 herein, and suitable apparatus details therefor are discussed in the above-cited and other references.

Briefly describing the functioning of the apparatus 10 for single pass duplex/duplex copying, the individual document to be reproduced is fed into the apparatus 10 from an appropriate document tray through the belt feed 46 here, short edge first. This causes the document to be first passed over, and scanned by, the first exposure station 22. At this point, the second mirror 28 is tilted into its first position providing the first optical path 40 from the first exposure station 22 to the photoconductor drum 12. Thus, the only operational optics are the single mirror 28 and the single lens system 32, and the image on the photoreceptor is "right reading". The preferred orientation of the document, as seen from the machine, is left side inboard with the document being scanned from right to left with the top being the leading edge.

As the document continues further under the action of the belt feed 46 or other suitable document feeder, it is next fed onto the document drum 44, secured thereto, and rotated around the document drum 44 past the second exposure station 24. Thus, the opposite side of the document is now exposed. The document has been reversed and the second side thereof is being viewed in the second exposure station 24. The bottom of the document drum 44, and thus the document, at the second exposure station 24 is moving in a direction opposite to that with which the document was fed past the first exposure station 22. Also, at this point the second mirror 28 has been shifted to provide the second optical path 42 through the first mirror 26, thus the operational optics are now two mirrors rather than one, and the image on the photoreceptor is therefor now "wrong reading". The document orientation is now right side inboard and the scanning direction of the document is left to right with the top still being the leading edge. This operation provides the proper sequence and orientation of latent images on the photoconductor drum 12 for development and transfer (with the transfer drum 20) of permenant visual images onto the copy sheet 16 in the same position and orientation as that of the document being copied.

In conclusion, it may be seen that by the abovedescribed cooperative combination and method of orientation that duplex copying can be provided with a simple, inexpensive and reliable system requiring less optical components and only slight movement of one component in the optical path. Further, these components may be conventional and relatively non-critical.

The exemplary embodiments described herein is presently considered to be preferred; however, it is contemplated that further variations and modifications within the purview of those skilled in the art can be made herein. The following claims are intended to cover all such variations and modifications as fall within the true spirit and scope of the invention.

What is claimed is:

1. In optical reproducing apparatus providing duplex copying of an original document onto a single duplicating imaging surface, the improvement comprising:
   an imaging surface;
   a first exposure station for exposing a side of said original document;
   a second exposure station for said document spaced from said first exposure station;
   document reversal means for exposing in said second exposure station the opposite side of said document from said first esposure station;
   a first and fixed mirror optically aligned with said second exposure station;
   a second and pivotably mounted mirror spaced from said first mirror;
   and means for pivoting said second mirror between a first position and a second position,
   said second mirror in said first position being optically aligned with said first exposure station and providing a first reflective optical path through said second mirror from said first exposure station to said imaging surface,
   said second mirror in said second position being optically aligned with said first mirror and providing through said first and second mirrors together a second reflective optical path from said second exposure station to said imaging surface,
   said second reflective optical path providing reversion on said imaging surface of said document exposed at said second exposure station relative to the exposure of said document at said first exposure station.

2. The apparatus of claim 1 wherein said second imaging station comprises rotatable document carrying drum means providing said document reversal means and providing a direction of motion of said document at said second exposure station opposite from said first exposure station.

3. The apparatus of claim 1 wherein said first and second reflective optical paths have the same optical path length, and a common lens system therefor is provided adjacent said imaging surface.

4. The apparatus of claim 1 wherein said imaging surface is a moving xerographic photoconductive surface and the activation of said means for pivoting said second mirror is coordinated with the movement of said surface, and wherein copy feed means are provided for feeding a copy sheet into operative engagement with said photoconductive surface.

5. The apparatus of claim 1 wherein said second mirror is pivotably mounted for simple rotation centrally about a single axis and said first and second positions of said second mirror are less than approximately 90° of rotation apart.

6. The apparatus of claim 1 wherein said first and second mirrors are single plane mirrors.

7. The apparatus of claim 3 wherein said first and second mirrors are single plane mirrors.

8. The apparatus of claim 5 wherein said first and second mirrors are single plane mirrors.

9. The apparatus of claim 1 wherein said first and second relfective optical paths have the same optical path length, and a common lens system therefor is provided adjacent said imaging surface, wherein said imaging surface is a moving xerographic photoconductive surface and the activation of said means for pivoting said second mirror is coordinated with the movement of said surface, wherein copy feed means are provided for feeding a copy sheet into operative engagement with said photoconductive surface, wherein said second mirror is pivotally mounted for simple rotation about a single axis and said first and second positions of said second mirror are less than approximately ninety degrees of rotation apart, wherein said first and second mirrors are single pleane mirrors, and wherein said second reflective optical path is obtusely reflected by said first mirror and acutely reflected by said second mirror.

10. The apparatus of claim 4 including image transfer means operatively engaging said photoconductive surface whereby an image from said first exposure station through said first optical path to said photoconductive surface is transferred from said photoconductive surface to said transfer means for subsequent transfer from said transfer means to the backside of a copy sheet fed between said photoconductive surface and said transfer means by said copy feed means.

11. In optical reproducing apparatus providing copying of an original document onto a single duplicating imaging surface, the improvement comprising:

an imaging surface, a first exposure station for exposing a side of said original document comprising a horizontal platen, a second exposure station for said document spaced from said first exposure station, said second exposure station comprising a rotatable document carrying drum on which document exposure occurs as the document is carried on and rotated by the drum for high speed repeat copying of the document, and mirror means selectively movable between a first position and a second position, said mirror means in said first position providing a first reflective optical path from said first exposure station to said imaging surface, said mirror means in said second position providing a second reflective optical path from said second exposure station to said imaging surface.

12. The apparatus of claim 11 wherein said document drum provides document reversal means for exposing in said second exposure station the opposite side of said document from said first exposure station.

13. The apparatus of claim 11 further including feed means for feeding documents from said first exposure station to said second exposure station.

14. The appartus of claim 11 wherein said mirror means moves only one mirror by less than 90° to move between said first position and said second position.

* * * * *